No. 831,278. PATENTED SEPT. 18, 1906.
R. W. GOEB.
MACHINE FOR FORMING STOPPERS FROM PULP FIBER.
APPLICATION FILED APR. 19, 1906.

Witnesses:

Inventor:
Rudolph W. Goeb.
by Bakewell Cornwall Attys

No. 831,278. PATENTED SEPT. 18, 1906.
R. W. GOEB.
MACHINE FOR FORMING STOPPERS FROM PULP FIBER.
APPLICATION FILED APR. 19, 1906.

Witnesses:
Inventor:
Rudolph W. Goeb.
by Bakewell & Cornwall Attys.

No. 831,278. PATENTED SEPT. 18, 1906.
R. W. GOEB.
MACHINE FOR FORMING STOPPERS FROM PULP FIBER.
APPLICATION FILED APR. 19, 1906.

Witnesses:
Fred Henke.
Wells L. Church.

Inventor:
Rudolph W. Goeb.
by Bakewell Cornwall Attys.

No. 831,278. PATENTED SEPT. 18, 1906.
R. W. GOEB.
MACHINE FOR FORMING STOPPERS FROM PULP FIBER.
APPLICATION FILED APR. 19, 1906.

Witnesses:

Inventor:
Rudolph W. Goeb.
by Bakewell + Cornwall Attys.

No. 831,278. PATENTED SEPT. 18, 1906.
R. W. GOEB.
MACHINE FOR FORMING STOPPERS FROM PULP FIBER.
APPLICATION FILED APR. 19, 1906.

Witnesses:
Fred Hauke.
Nells L. Church.

Inventor:
Rudolph W. Goeb.
By Bakewell & Cornwall Attys.

UNITED STATES PATENT OFFICE.

RUDOLPH W. GOEB, OF ST. LOUIS, MISSOURI, ASSIGNOR TO UNITED STATES FIBRE STOPPER COMPANY, OF ST. LOUIS, MISSOURI, A CORPORATION OF SOUTH DAKOTA.

MACHINE FOR FORMING STOPPERS FROM PULP FIBER.

No. 831,278.     Specification of Letters Patent.     Patented Sept. 18, 1906.

Application filed April 19, 1906. Serial No. 312,646.

*To all whom it may concern:*

Be it known that I, RUDOLPH W. GOEB, a citizen of the United States, residing at St. Louis, Missouri, have invented a certain new and useful Improvement in Machines for Forming Stoppers from Pulp Fiber, of which the following is a full, clear, and exact description, such as will enable others skilled in the art to which it appertains to make and use the same, reference being had to the accompanying drawings, forming part of this specification, in which—

This invention relates to molding-machines, and particularly to machines for molding pulp fiber into the form of stoppers to be used for bottle-closures or for similar purposes.

The object of my invention is to provide a machine of simple construction in which stoppers can be made quickly and perfectly from pulp-water—namely, water having a certain percentage of pulp fiber mixed therewith.

In the machine herein shown, which represents the preferred form of my invention, receptacles are provided for receiving predetermined quantities of pulp-water from the supply-tank and carrying it into position to be acted on by pressing-dies, said receptacles being so constructed that most of the water drains away from the pulp fiber during the time the receptacle is traveling from the storage-tank to the pressing-dies. After the pulp fiber has been pressed by the pressing-dies it is acted upon by molding-dies, which form it into a solid cylindrical block, and this block is then forced into a tapered cylindrical die, which molds the pulp fiber into the form of a stopper. This tapered cylindrical die is formed in a movable member which is provided with a plurality of such dies and the stoppers remain in said member for an extended period of time, thus giving the pulp fiber time to set. Some water remains in the pulp fiber after it leaves the receptacle which carries it into position to be acted upon by the pressing-dies, and for extracting this water I prefer to subject the fiber to air-pressure and to a vacuum while it is being acted upon by the several dies referred to. While the stoppers are in the tapered cylindrical dies of the movable member they are subjected to a vacuum, and as the stoppers remain in said movable member for some time the extraction of all the water therefrom is insured, automatic means being provided for ejecting the completed stoppers from the dies of said movable member.

While the machine herein shown and described represents the preferred form of my invention, it should be understood that my invention is not limited to the details of construction of this machine, and various changes and arrangements of the elements therein could be made without departing from the spirit of my invention.

Referring to the drawings, which represent the preferred form of my invention, 1 designates the frame of the machine, which supports a tank 2, in which the pulp-water is contained, said tank being provided with an agitator 3. A device 4 is provided for measuring the pulp-water into predetermined quantities and for controlling its flow from the tank; but as said measuring device is substantially the same as that shown in my prior United States patent, No. 809,439, January 9, 1906, a detailed description of the same is deemed unnecessary.

Figure 7:
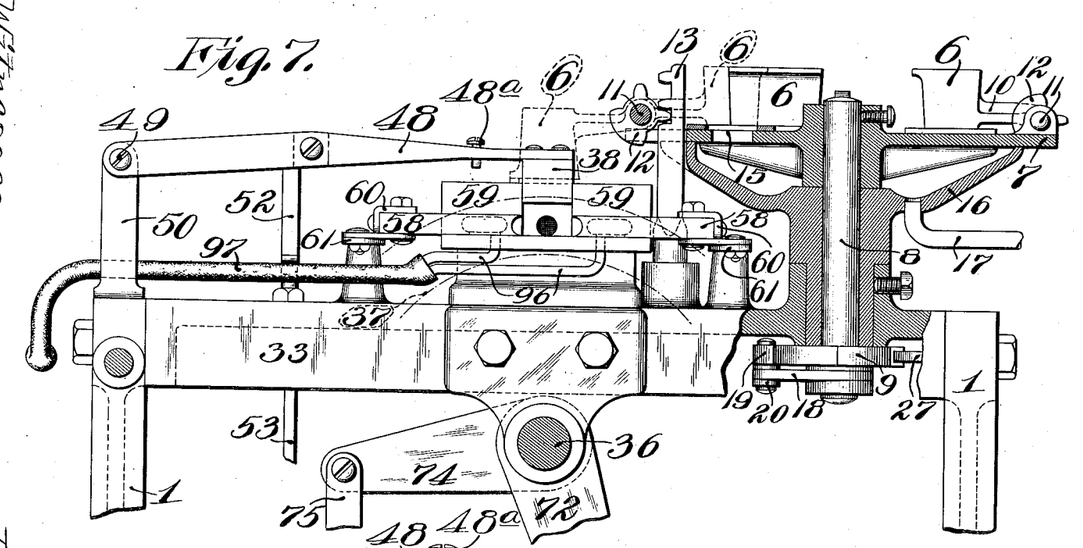
Fig. 7 is an enlarged detail front elevation showing the turn-table and its support in section.
Figure 8:
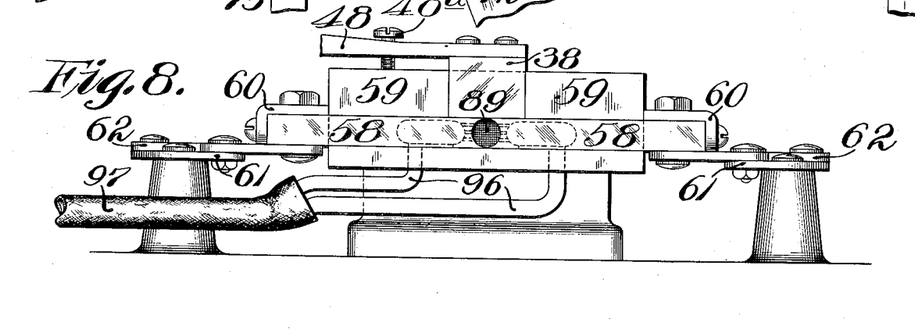
Fig. 8 is an enlarged detail view showing some of the parts in Fig. 7 in a different position.

In the machine herein shown the pulp-water is discharged from the measuring device through a spout 5 into buckets 6, mounted on a turn-table 7, said turn-table being carried by a vertical shaft 8, provided at its lower end with a ratchet 9, as shown in Fig. 7. The buckets are provided with arms 10, that are oscillatingly mounted on horizontal stud-shafts 11, carried by the turn-table, and one arm of each bucket is provided with a plurality of teeth 12, which at certain periods of the machine's cycle of operations coöperate with a vertically-reciprocating rack-bar 13, that imparts an oscillating movement to the buckets to dump the contents thereof.

The buckets are so constructed that the water will drain away from the pulp fiber, and preferably this is accomplished by forming the bottoms of the buckets from pieces of screening 14. Openings 15 are formed in the turn-table at the points where the buckets rest, and the track or support 16, upon which the turn-table travels, is formed hollow, as shown in Fig. 7, to receive the water which drains from the pulp fiber in the buckets. A waste-pipe 17 communicates with the interior of said support to carry away the water therefrom. Preferably the turn-table is provided with four buckets; but it is obvious that this number could be changed without departing from the spirit of my invention.

Figure 2:
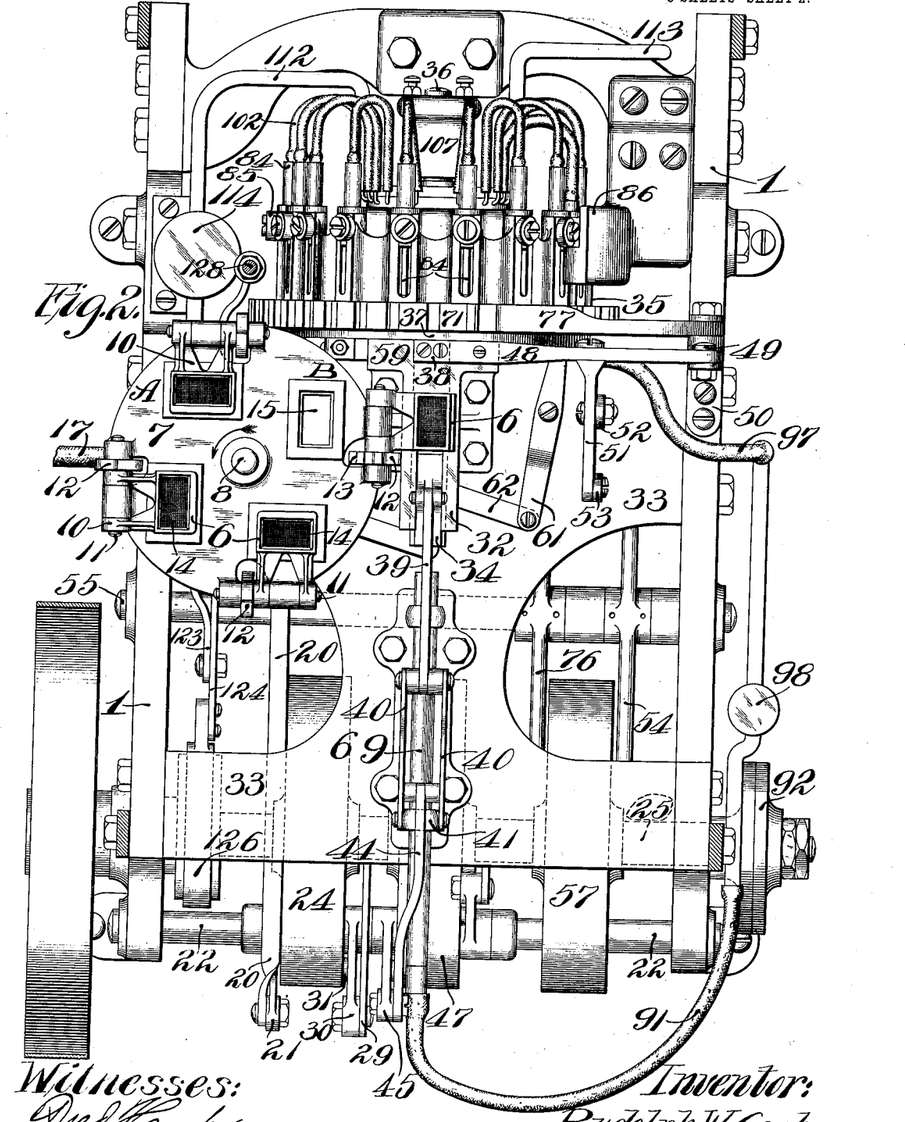
Fig. 2 is a top plan view of the machine shown in Fig. 1.
Figures 9, 10, 11, 12:
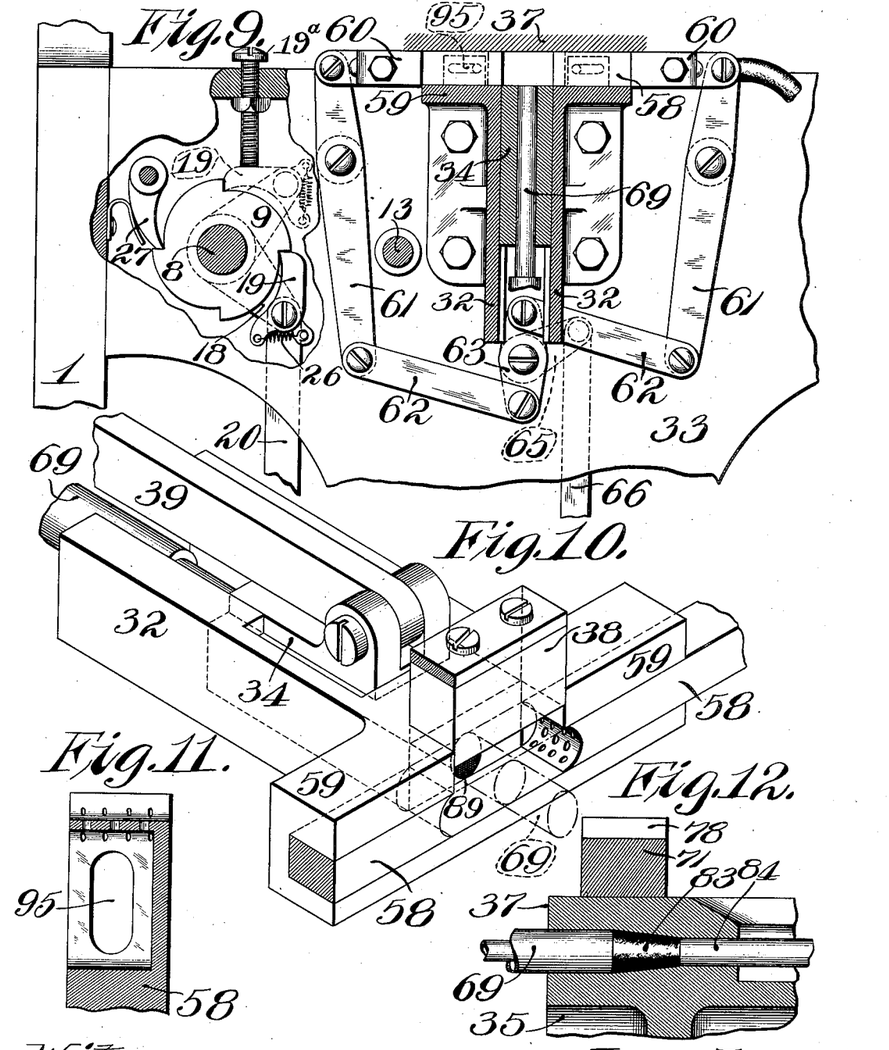
Fig. 9 is an enlarged plan view, partly in section, showing the concaved side dies and their actuating mechanism, a portion of the top plate of the frame of the machine being broken away to show the pawl-and-ratchet mechanism which imparts rotary movement to the turn-table.
Fig. 10 is a detail perspective view showing the concaved dies and also the dies which first act on the pulp fiber.
Fig. 11 is a detail sectional view of one of the concaved dies.
Fig. 12 is a sectional view of a portion of the rim of the turret, showing a completed stopper in one of the dies of said rim.

The mechanism for imparting a rotary movement to the table consists of a lever 18, loosely mounted on the turn-table shaft below the ratchet 9 and provided with a pawl 19, which coöperates with the teeth of said ratchet, as shown in Fig. 9. The lever 18 is actuated by means of a link 20, connected at its rear end to a rock-lever 21, fulcrumed on a stationary shaft 22 at the rear of the machine, said rock-lever being provided with a roll 23, which travels in a cam-groove formed in one face of a cam-block 24, carried by the main shaft 25. The pawl on lever 18 is held normally in engagement with the ratchet 9 by a spring 26, and retrograde movement of said ratchet and the turn-table is prevented by means of a spring-actuated dog 27, which coöperates with said ratchet, an adjustable stop 19$^a$ preventing the pawl from overthrowing. Accordingly as the main shaft of the machine revolves the turn-table will be rotated intermittently, and thus carry the buckets from the point A, where they are filled, to the point B, where they are dumped, this being indicated in Fig. 2, which shows one of the buckets dumped. As the turn-table completes three-quarters of a revolution between the time a bucket is filled and the time it is dumped, sufficient time is provided for most of the water to drain away from the pulp fiber into the hollow support 16, upon which the table travels.

Figures 3, 4:
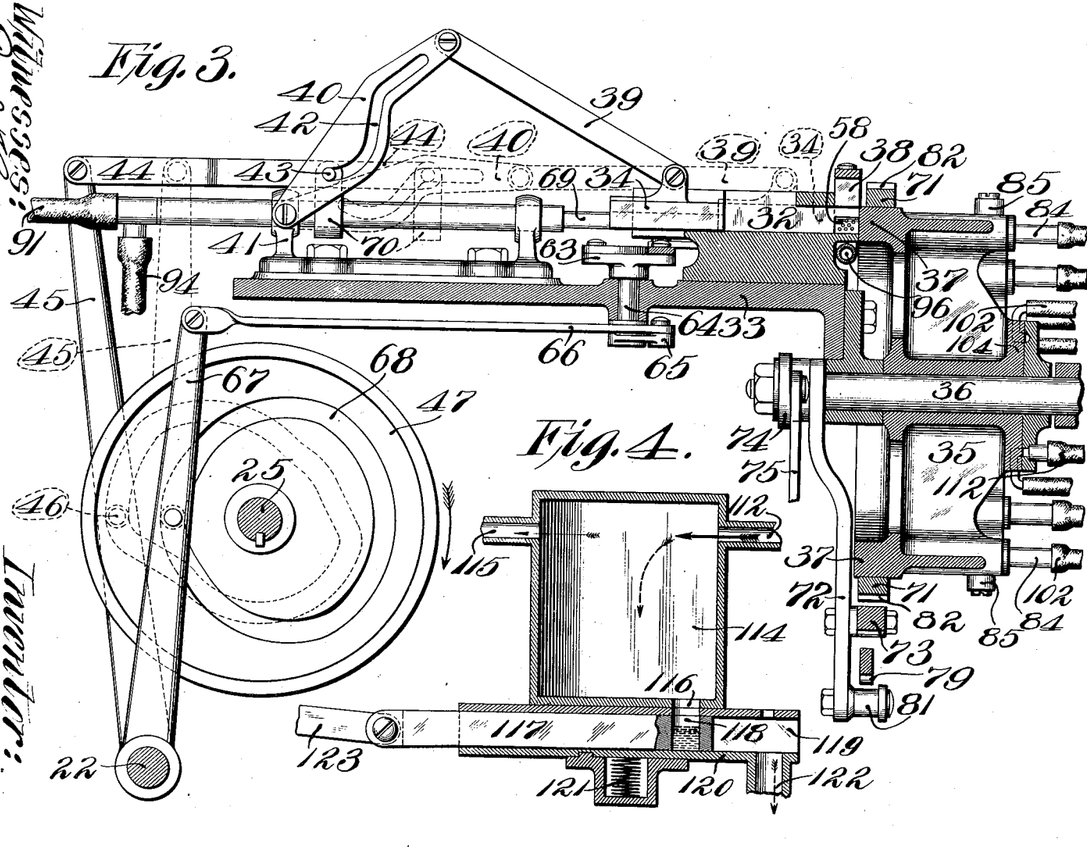
Fig. 3 is a partial longitudinal sectional view taken at approximately the center of the machine.
Fig. 4 is a detail sectional view of the trap which receives the water from the turret-dies.
Figures 13, 14:
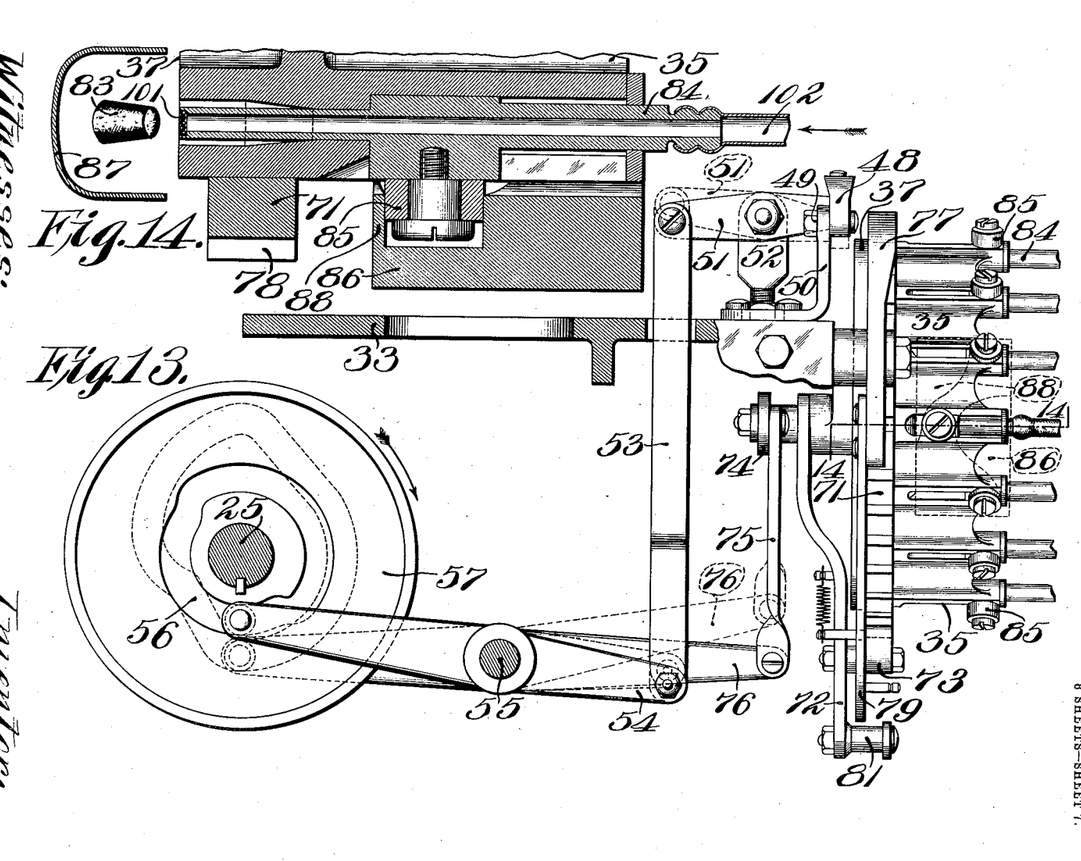
Fig. 13 is a detail view showing principally the mechanism for actuating the turret.
Fig. 14 is an enlarged horizontal sectional view of a portion of the turret, taken on the line 14 14 of Fig. 13.

The vertically-reciprocating rack-bar 13, which dumps the buckets, is connected at its lower end to a bell-crank lever 28, said lever being actuated by a link 29, connected at its rear end to a rock-lever 30, having a roll 31, which travels in a groove formed in the other side face of the cam-block 24. As a bucket is dumped the contents thereof drops into an open-ended trough formed by guideways 32, carried by the top-plate 33, forming part of the frame of the machine and having a plunger 34 reciprocatingly mounted therein. At the front of the machine is a rotatably-mounted turret 35, carried by a shaft 36. Said turret is of substantially skeleton form, comprising a hub and a rim 37, which closes the front end of the trough into which the contents of the buckets are dumped, as shown in Fig. 3. A plurality of tapered cylindrical recesses acting as dies are formed in the rim of said turret, and intermediate these dies are solid portions which coöperate with the plunger 34 to compress the pulp fiber as said plunger moves forwardly after the contents of a bucket has been dumped into the trough. Coöperating with the plunger and the solid face of the rim of the turret is a vertically-movable die 38 and concaved face side dies 58, and when said coöperating members are brought together the pulp fiber will be molded into the form of a rectangular block having rounded ends, said block being thereafter molded into the form of a cylindrical block by the side dies 58, and this cylindrical block being then forced into the tapered cylindrical dies in the rim of the turret to form a stopper of the form shown in Fig. 12. Reciprocating movement is imparted to the plunger 34 by means of a link 39, connected at one end to the plunger and at its rear end to a lever 40 of substantially yoke form and pivoted to a stationary support 41, carried by the top plate of the frame of the machine. Said lever 40 is provided with an irregularly-shaped slot 42, into which a pin 43 projects from a link 44, connected to the upper end of a rock-lever 45, mounted on the shaft 22 at the rear of the machine, and provided with a roll 46, which travels in a cam-groove formed in the side face of a cam-block 47 on the main shaft of the machine. The vertically-moving die 38, which coöperates with the plunger and the solid face of the rim of the turret to compress the fiber into a rectangular block, is carried by an arm 48, pivotally connected at 49 to a stationary support 50, said arm being provided with an adjustable stop 48$^a$. A lever 51, pivotally mounted on a stationary support 52, as shown in Fig. 13, is connected to approximately the center of the arm 48, and the rear end of said lever has fastened thereto a link 53, which is connected at its lower end to a lever 54, fulcrumed on a horizontally-extending shaft 55, said lever being provided with a roll traveling in a groove 56, formed in a cam-block 57, mounted on the main shaft, the movement of the lever 54 operating to rock the arm 48 for raising and lowering the die 38.

The dies 58 which convert the rectangular-shaped block of pulp fiber into the form of a cylindrical block are mounted in guideways 59 at the front end of the trough in which the plunger 34 operates, said dies having concave faces, as shown in Fig. 10, which are provided with perforations for a purpose hereinafter described. Each die carries an adjustable stop 60 and is pivotally connected, by means of a link, to a lever 61, and said levers are actuated to move the dies toward and from each other by a double toggle consisting of links 62, connected to the rear ends of said levers and also pivotally connected to a cross-head 63, carried by a vertical stud-shaft 64, journaled in the top plate 33 of the frame of the machine and provided at its lower end with a rock-arm 65, having one end of a link 66 connected thereto, the rear end of said link being connected to a rock-lever 67, provided with a roll which travels in a groove 68, formed in the other side face of the cam-block 47, as shown in Fig. 3. After the pulp fiber has been molded by the concaved dies 58 into the form of a solid cylindrical block said block is forced from said dies into one of the tapered cylindrical dies formed in the rim of the turret, said turret having been previously rotated slightly to bring said tapered die into alinement with the concaved side dies.

Figures 15, 16, 17:
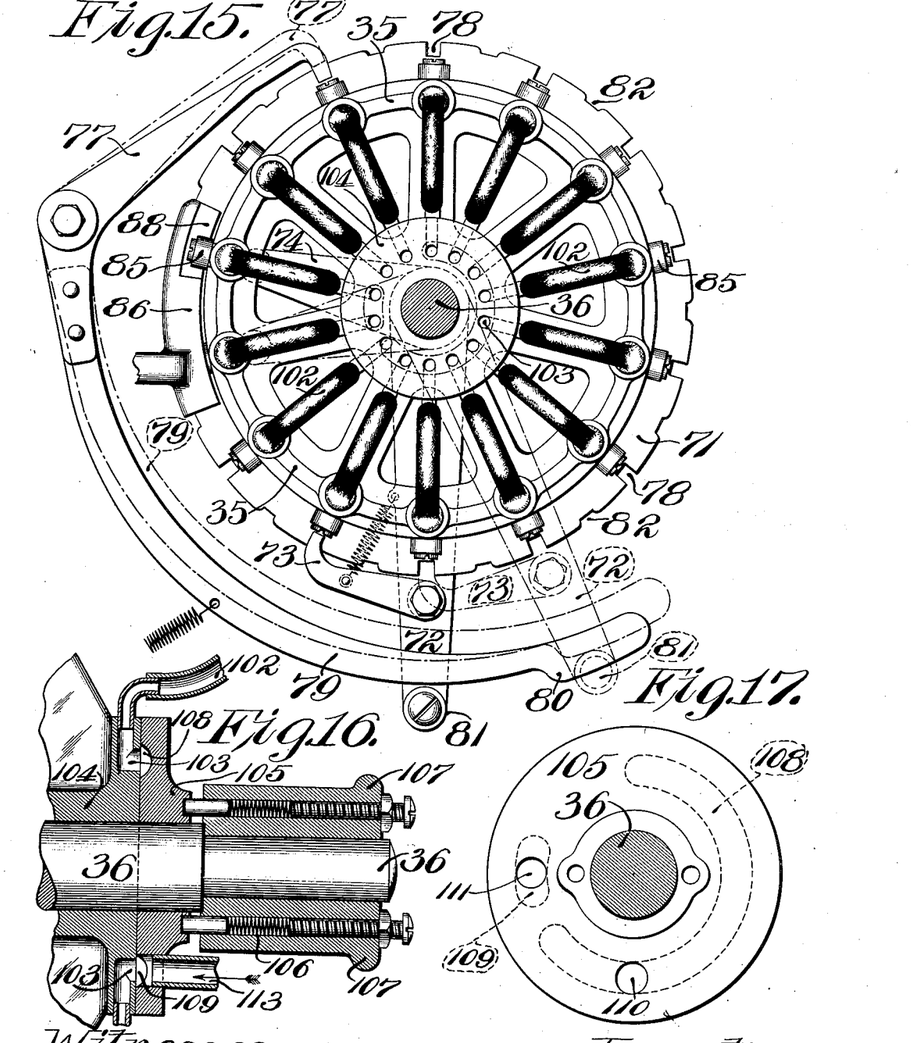
Fig. 15 is a front elevation of the turret and the locking-dog for holding same at rest.
Fig. 16 is a sectional view of the valve carried by the turret and its coöperating valve-seat.
Fig. 17 is a front elevation of said valve-seat.

The means for forcing the cylindrical fiber-block into the tapered die of the turret consists of a die 69, reciprocatingly mounted in the plunger 34 and having a collar 70 fastened thereto, which is connected to the link 44, that actuates the lever 40. The turret 35 is provided with a notched ring 71, and a bell-crank lever 72, which is loosely mounted on the shaft 36, that carries the turret, has a spring-actuated pawl 73, which engages one of the notches in said ring, and imparts a rotary movement to the turret whenever said lever is actuated. The short arm 74 of said bell-crank lever is connected, by means of a link 75, to the front end of a lever 76, mounted on the horizontally-extending shaft 55 and provided at its rear end with a roll which travels in a groove formed in a cam-block 57, whereby said bell-crank lever 72 is rocked intermittently to impart a step-by-step movement to the turret. For holding the turret securely in position while the cylindrical fiber-block is being forced into one of the tapered cylindrical dies therein to form a stopper I prefer to provide a locking-dog 77, which engages comparatively deep notches 78 in the ring that is fastened to the turret. Said locking-dog is of substantially bell-crank-lever form, as shown in Fig. 15, and its long arm 79 is provided at its outer end with a cam-face 80, that is engaged by a roll 81 on the long arm of the bell-crank lever 72 whenever said lever moves backwardly its full stroke to cause its pawl to engage one of the deep notches in the ring preparatory to imparting movement to the turret, said roll operating to lock said locking-dog 77 and free it from engagement with the deep notch in the ring 71. The ring 71 is also provided with shallow notches 82, having rounded corners, and the locking-dog 77 is adapted to coöperate with these notches to hold the turret at rest while the solid portions of its rim are coöperating with the plunger 34 to mold the pulp fiber into a rectangular block. The turret is rotated twice at each cycle of operations of the machine, first, to bring a solid portion of its rim into position to coöperate with the plunger and then to bring one of the tapered cylindrical dies into position to have the cylindrical block of fiber forced therein, the cam-groove which causes movement to be imparted to the bell-crank lever 72 being so formed that said lever is moved forwardly for a short distance, then stopped, and thereafter moved forwardly the remainder of its stroke. The stopper 83, which has been formed by forcing the pulp fiber into the tapered cylindrical die in the turret, remains in said die during the time the turret is making practically three-quarters of a revolution, and then said stopper is automatically ejected by means of a plunger 84, which forms the bottom of the tapered cylindrical die. Said plungers are reciprocatingly mounted in the rim of the turret, and each is provided with a roll 85, which comes into engagement with a cam-face on the stationary block 86, that imparts a rearward reciprocating movement to said plunger to force the completed stopper from the tapered die in the turret, as shown in Fig. 14, said stopper dropping into the discharge-chute 87. Said roll then comes into engagement with the second cam-face 88 on said block, which imparts a reciprocating movement to the plunger in the reverse direction and restores it to normal position.

Although a great deal of water is drained from the pulp fiber during the time the buckets are traveling from their receiving position into their dumping position, some water still remains in the fiber, and it is necessary to extract this water during the process of forming the stopper. I prefer to do this by means of an air-vacuum and an air-pressure while the fiber is being acted on by the plunger 34 and the other molding-dies.

Figure 1:
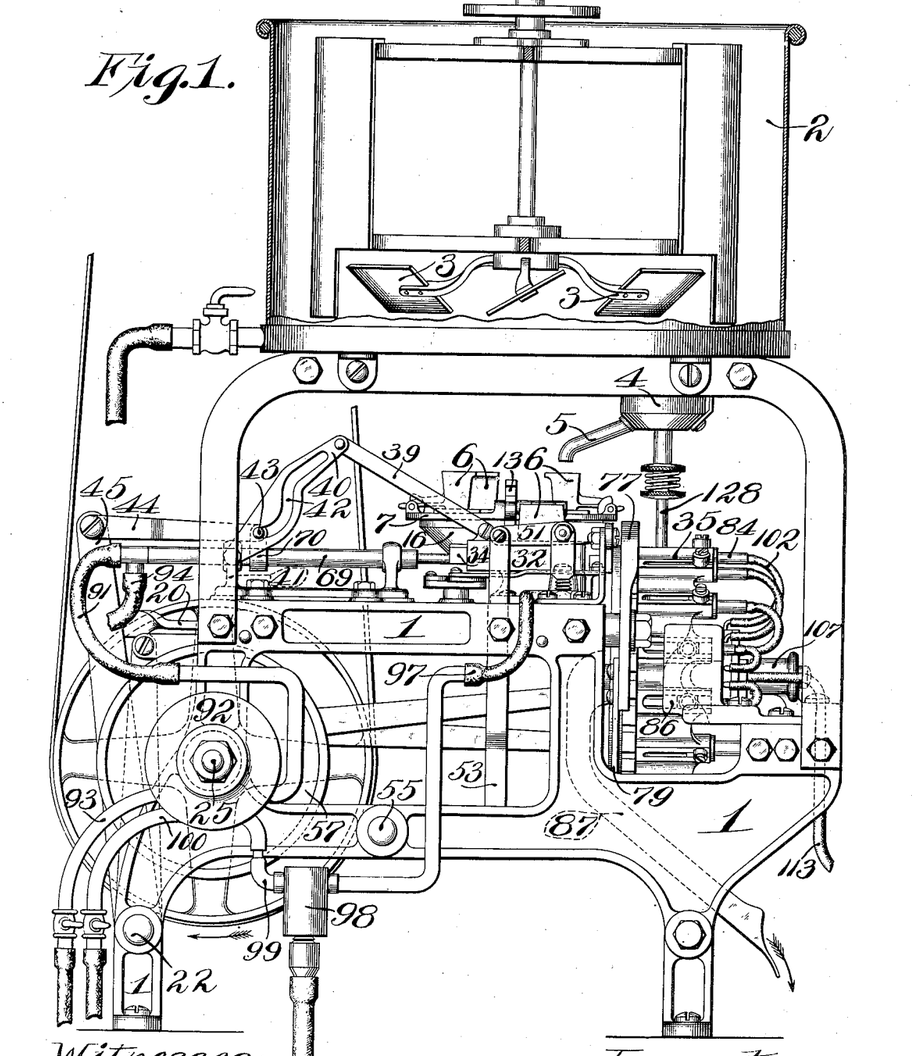
Figure 1 is a side elevation of a machine embodying the features of my invention.
Figures 5, 6:
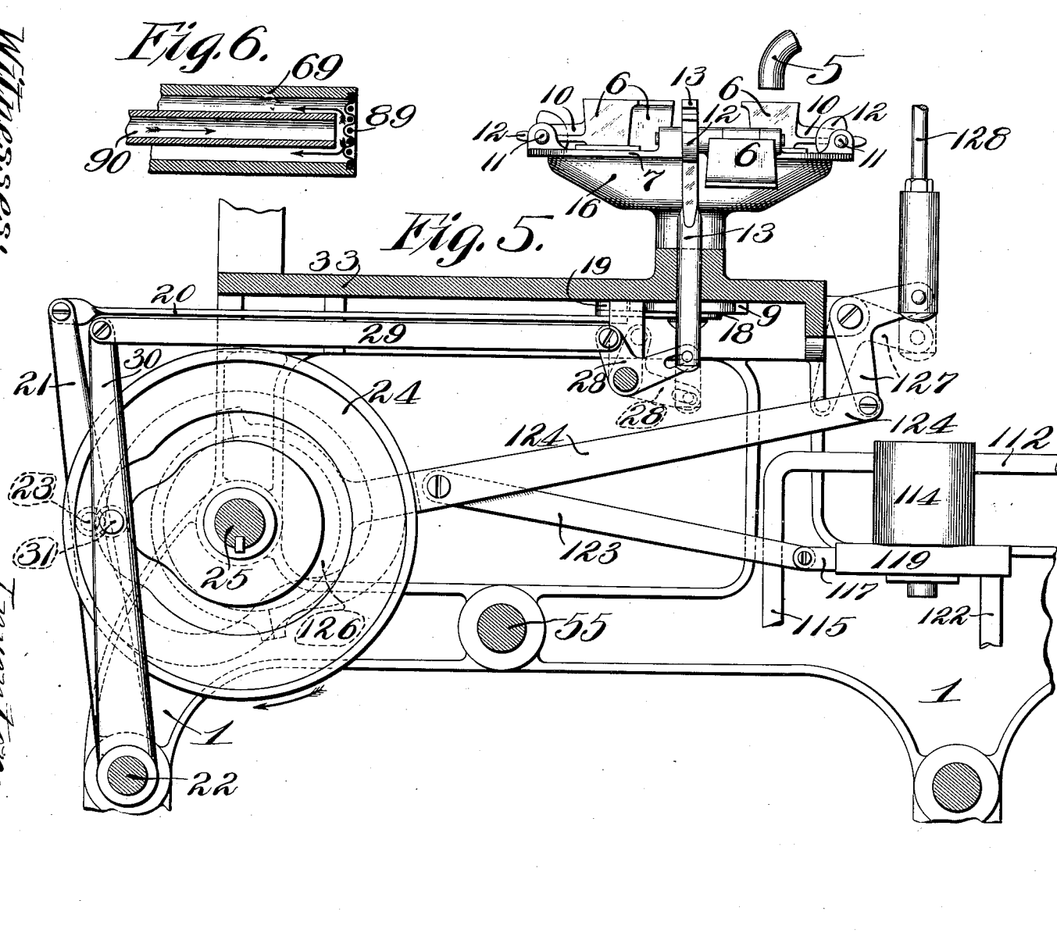
Fig. 5 is a partial longitudinal sectional view taken adjacent the center of the machine.
Fig. 6 is a detail sectional view of the die which forces the pulp fiber into the tapered cylindrical dies of the turret.

The die 69, which is mounted in the plunger 34, is hollow, as shown in Fig. 6, and its front end is formed by a piece of screening 89, the end of said die normally extending flush with the engaging face of the plunger 34, so that said piece of screening forms a portion of the engaging face of the plunger and accordingly is in contact with the pulp fiber while it is being molded into the form of a rectangular block. A tube 90 of small diameter is located in the hollow die 69, and air-pressure is supplied to the tube 90 through a flexible tube 91, communicating with a port in a stationary valve-seat, with which coöperates a valve 92 of substantially the construction shown in my prior United States Patent, No. 801,659, so that a detailed description and illustration of the same is not deemed necessary. The valve-seat is provided with a second port, and positive air-pressure is supplied to this port by means of a pipe 93. The valve 92, which is shown in Fig. 1, is splined to the main shaft of the machine and is provided on its inner face with an elongated recess which during the rotation of the valve comes into alinement with the two ports in the valve-seat, and thus establishes communication between the pipe 93 and the tube 91 to cause a prolonged blast of air to pass through the tube 90, located inside of the hollow die. The blast of air passing through said tube, as indicated by the arrow in Fig. 6, meets an obstruction—namely, the pulp fiber against which the screening 89 presses—and consequently forces the water out of the pulp fiber through the hollow die 69, the pulp fiber being prevented from passing away with the water by means of the piece of screening, the waste water draining away from the hollow die through a discharge-tube 94.

During the time the rectangular block of pulp fiber is being acted upon by the dies 58, which mold it into the form of a cylindrical block, said pulp fiber is subjected to an air-vacuum, which further draws the water therefrom, this being accomplished by forming a large recess in each of the dies 58, as shown in Fig. 11, and a slot 95 in the bottom of the die communicating with said recess and registering with the end of a pipe 96, in which a vacuum is created. The pipes 96 for each of the dies 58 are connected to a flexible tube 97, which communicates with a trap 98, a pipe 99 leading from this trap and communicating with a port in the valve-seat, with which the valve 92 coöperates. Said valve-seat is provided with a second port, with which a vacuum-pipe 100 communicates, and the valve 92 is provided on its inner face with a second elongated recess, which intermittently registers with said two ports to cause a vacuum to be created in the pipes 96 for drawing the water away from the pulp fiber through the perforations in the dies 53 during the time said dies are molding the fiber, the vacuum being discontinued before the cylindrical block of fiber is forced out of said dies.

After the concave perforated dies have moved together the hollow die 69 is moved forwardly to force the cylindrical block of fiber from said dies 58 into one of the tapered cylindrical dies in the rim of the turret. The hollow die 69, as previously described, is connected to the link 44, which causes the plunger 34 to be moved forwardly, and the end of said die normally extends flush with the engaging face of said plunger. The cam-groove, which rocks the lever 45, that actuates the link 44, is so formed that it will rock said lever into the position shown in dotted lines in Fig. 3 and then remain at rest for a short period while the dies 58 are moving together and then rock said lever 45 still farther to cause the hollow die 69 to force the cylindrical block of fiber into one of the dies of the turret. The movement of the hollow die relatively to the plunger 34 is accomplished by forming the slot in the lever 40 with a straight portion, as shown in Fig. 3, so that when the pin 43 on the link 44 comes into the straight portion of the slot no movement will be imparted to the lever 40. While the stoppers are in the dies of the turret, they are subjected to a vacuum, and as each stopper remains in the turret during the time that it is traveling practically three-quarters of a revolution every particle of water is drawn out of the pulp fiber from which the stopper is formed, and sufficient time is allowed for the fiber to set. This is accomplished by forming the plunger 84 hollow, as shown in Fig. 14, and having its end covered by a piece of screening 101, which forms the bottom of the tapered cylindrical die in the turret. A tube 102 is connected to the front end of each of the plungers, and the other ends of said tubes communicate with ports 103 in a valve 104, that rotates with the turret. A valve-seat 105 is mounted on the shaft 36, which carries the turret; but said valve-seat is prevented from rotating with the turret, said seat being held yieldingly in engagement with its valve by means of a spring 106, carried by the journal-bearing 107 for the front end of the turret-shaft. (See Fig. 16.) The valve-seat 105 is provided on its inner face with a long curved recess 108 (shown in dotted lines in Fig. 17) and with a short recess 109. (Also shown in dotted lines in said figure. Inlet-openings 110 and 111 are formed in the valve-seat, communicating, respectively, with said recesses, and a tube 112 extends into the opening 110 and a tube 113 into the opening 111. The tube 112 communicates with the interior of a trap 114 at the right-hand side of the machine, said trap being shown in detail in Fig. 4, and a tube 115, leading from an air-vacuum, also communicates with the interior of said trap, thereby producing a vacuum in the tube 112.

When the turret arrives in position to place one of its tapered cylindrical dies in alinement with the die 69, which forces the pulp fiber into said die, the port 103 in the valve 104, which corresponds with said tapered die, will register with the upper end of the recess 108 on the inner face of the valve-seat 105, so that a vacuum will be created in the plunger 84, which forms the bottom of said tapered die, and thus draw the water down into the trap 114. Said port remains in register with said recess until just before the turret reaches the position at which the roll of said plunger 84 comes into engagement with the cam-face on the block 86, which causes said plunger to move rearwardly to eject the stopper out of said die into the discharge-chute, and as soon as said port passes out of communication with the recess 108 it passes into register with the recess 109 in the valve-seat 105. The pipe 113, which communicates with the recess 109, leads from a supply of compressed air, so that when the port in the valve registers with this recess the air will rush through the tube 102 and plunger 84 and blow the completed stopper from the screen, which forms the end of said plunger.

A discharge-opening 116 is formed in the bottom of the trap 114, and a slide 117, provided with an opening 118, is reciprocatingly mounted in a stationary guideway 119, connected to the trap, the bottom of said guideway being formed by a movable plate 120, which is forced upwardly by a spring 121 to press the slide tightly against the upper wall of the guideway, the plate 120 being provided near its front end with a discharge-pipe 122. The slide 117 is reciprocated by means of a link 123, which is connected at its rear end to a link 124, provided with a strap which surrounds an eccentric 126 on the main shaft, and the front end of said link is connected to a bell-crank lever 127, which actuates the rod 128, that opens and closes the valves comprising part of the measuring device 4.

When the slide is in its rearward position, its opening 118 will aline with the opening 116, formed in the bottom of the trap, so that the water in the trap will pass into the opening in the slide, the slide being comparatively thick, so that the opening therein constitutes a cup. When the slide moves forwardly, its opening will register with the discharge-pipe 122, through which the water escapes, so that means is thus provided for carrying the water out of the trap 114.

Having thus described my invention, what I claim as new, and desire to secure by Letters Patent, is—

1. In a machine of the class described, a perforated receptacle for receiving a quantity of pulp-water, a movable carrier on which said receptacle is mounted, a hollow member which receives the water that drains away from the pulp fiber, means for turning said receptacle over to deposit the wet pulp fiber at a certain point, dies which mold the pulp fiber into the form of a stopper, and means for extracting all of the water from said pulp fiber; substantially as described.

2. In a machine of the class described, a movable member carrying a plurality of oscillating perforated receptacles for receiving a quantity of pulp-water, means for collecting the water which drains away from the pulp fiber, means for oscillating said receptacles to discharge the pulp fiber therefrom, dies which mold the pulp fiber into predetermined form, and means for extracting all of the water from said pulp fiber; substantially as described.

3. In a machine of the class described, a turn-table carrying a plurality of pivotally-mounted perforated receptacles, means for moving said table intermittently, means for actuating said receptacles to discharge the contents thereof, dies for molding the pulp fiber into predetermined form, and means for extracting the water from said pulp fiber while it is being acted upon by said dies; substantially as described.

4. In a machine of the class described, a movable member provided with a plurality of pivotally-mounted perforated receptacles, means for actuating said receptacles to discharge the contents thereof, and dies for molding the material discharged from said receptacles into predetermined form; substantially as described.

5. In a machine of the class described, a movable member provided with a plurality of pivotally-mounted perforated receptacles, a rack-bar for actuating said receptacles to discharge the contents thereof, and dies for molding the material discharged from said receptacles into predetermined form; substantially as described.

6. In a machine of the class described, a trough, a plunger reciprocatingly mounted in said trough, means for depositing a mass of wet pulp fiber in said trough, dies coöperating with said plunger to mold the pulp fiber into predetermined form, dies for thereafter acting on said pulp fiber to mold it into cylindrical form, and a movable member provided with dies into which the pulp fiber is forced to mold it into the form of a stopper; substantially as described.

7. In a machine of the class described, a trough for receiving a quantity of wet pulp fiber, a movable member having a solid face which closes the end of said trough and provided with a die adjacent said solid face, a plunger reciprocatingly mounted in said trough for pressing the pulp fiber, dies which thereafter act upon the fiber to mold it into cylindrical form, means for actuating said movable member to bring its die into alinement with the trough, and means for forcing the pulp fiber into the die in said member; substantially as described.

8. In a machine of the class described, a trough for receiving a quantity of pulp fiber, a plunger reciprocatingly mounted in said trough for acting upon said pulp fiber, molding-dies coöperating with said plunger to mold the pulp fiber into predetermined form, a member provided with a recess acting as a die, a hollow die mounted in the plunger, means for causing the water from the wet pulp fiber to be drawn through said hollow die by means of air-pressure, and means for moving said hollow die relatively to said plunger to force the pulp fiber into the recess of said member; substantially as described.

9. In a machine of the class described, a hollow support, a turn-table rotatably mounted on said support and provided with a plurality of openings, and a plurality of buckets pivotally mounted on the turn-table over said openings and provided with perforated bottoms; substantially as described.

10. In a machine of the class described, dies for molding a mass of wet pulp fiber into predetermined shape, a movable member provided with dies, means for forcing the pulp fiber into the dies of said member to mold it into predetermined form, and means for subjecting the pulp fiber to an air-vacuum while it remains in the die of said member for extracting the water therefrom; substantially as described.

11. In a machine of the class described, dies for molding a mass of wet pulp fiber into a predetermined shape, a member provided with dies, means for forcing the pulp fiber into the dies of said member, means for subjecting the pulp fiber to an air-vacuum while it remains in said member, means for imparting an intermittent movement to said member, and means for ejecting the molded fiber from said member; substantially as described.

12. In a machine of the class described, dies for molding a mass of wet pulp fiber into a predetermined shape, means for supplying pulp fiber to said dies, a movable member provided with a plurality of dies, means for forcing the pulp fiber into one of the dies of said member after it has been shaped by the dies first referred to, means for actuating said movable member, and means for extracting the water from the pulp fiber before it leaves the die of said member; substantially as described.

13. In a machine of the class described, dies provided with concave faces for molding a mass of wet pulp fiber into the form of a cylindrical block, an air-vacuum for acting upon the pulp fiber while it is being molded by said dies, a movable member provided with a plurality of tapered openings acting as said dies, means for forcing the cylindrical block of pulp fiber into one of the dies of said member, plungers mounted in said movable member in alinement with the tapered openings therein and provided with perforated ends, means for creating a vacuum in said plunger, and means for actuating said plungers to eject the molded pulp fiber from the dies of said movable member; substantially as described.

14. In a machine of the class described, a movable member provided with a plurality of openings acting as dies, means for forcing pulp fiber into said openings, devices mounted in said movable member in alinement with said openings and provided with perforated ends which form the bottoms of said dies, each of said devices being provided with a bore or passage-way, a valve which moves with said movable member, said valve being provided with ports which communicate with the bores of said devices, a stationary valve-seat provided on its inner face with a recess that registers with a number of the ports of said valve, and an air-vacuum pipe communicating with the recess of said valve; substantially as described.

15. In a machine of the class described, a turret provided with a plurality of openings acting as dies, plungers mounted in the turret in alinement with said openings and having perforated ends which form the bottoms of said dies, each of said plungers being provided with a bore, a valve moving with the turret and provided with a plurality of ports, tubes communicating with said ports and connected to the outer ends of said plungers, a stationary valve-seat provided on its inner face with a recess with which a number of the ports of said valve register simultaneously, an air-vacuum pipe communicating with said recess, a second recess formed in the valve-seat and registering with but a single port of the valve at the same time, and an air-pressure pipe communicating with said last-named recess; substantially as described.

16. In a machine of the class described, a die for acting on a mass of wet pulp fiber, an air-vacuum for extracting the water from said pulp fiber through said die, a trap into which the water drains, said trap being provided with an opening, a slide provided with an opening, and means for actuating said slide to move the opening therein into alinement with the opening of the trap; substantially as described.

17. In a machine of the class described, a die for acting on a mass of wet pulp fiber, an air-vacuum for extracting the water from said pulp fiber through said die, a trap into which the water drains, said trap being provided with an opening, a slide provided with an opening, means for actuating said slide to move the opening therein into alinement with the opening of the trap, and yielding means for holding the slide in intimate engagement with the trap; substantially as described.

18. In a machine of the class described, a die for acting on a mass of wet pulp fiber, an air-vacuum for extracting the water from said pulp fiber through said die, a trap into which the water drains, said trap being provided with an opening, a slide provided with an opening, a guideway in which the slide moves, a drain-pipe communicating with said guideway, and means for actuating said slide to cause its opening to aline with the opening in the trap and thereafter aline with the drain-pipe in the guideway; substantially as described.

19. In a machine of the class described, a die for acting on a mass of wet pulp fiber, an air-vacuum for extracting the water from said pulp fiber through said die, a trap into which the water drains, said trap being provided with an opening in its bottom, a guideway carried by the trap, a slide mounted in said guideway and provided with an opening, a spring-pressed plate forming the bottom of said guideway and having a drain-pipe connected thereto, and means for reciprocating the slide; substantially as described.

20. In a machine of the class described, a turret provided with a plurality of recesses acting as dies, means for rotating said turret intermittently, a locking device for said turret, plungers mounted in said turret in alinement with said dies, and a stationary cam with which projections on said plungers engage during the movement of the turret; substantially as described.

21. In a machine of the class described, a turret having notches formed in its periphery and provided with a plurality of dies, an actuated lever provided with a pawl which coöperates with the notches in said turret to impart movement thereto, a locking-dog for said turret, and means carried by said lever for moving the locking-dog into an inoperative position as said lever moves into position preparatory to feeding the turret forwardly; substantially as described.

22. In a machine of the class described, a trough for receiving a quantity of liquid pulp fiber, a plunger mounted in said trough, means coöperating with said plunger for compressing the pulp fiber, and means for causing the face of the pulp fiber which is acted upon by said plunger to be subjected to air-pressure which causes the liquid to be forced out of the fiber; substantially as described.

23. In a machine of the class described, a trough for receiving liquid pulp fiber, a plunger mounted in said trough, dies coöperating with said plunger to compress the pulp fiber, a movable member normally closing one end of the trough and provided with a die, and a reciprocating member mounted in the plunger for forcing the pulp fiber into said die; substantially as described.

In testimony whereof I hereunto affix my signature, in the presence of two witnesses, this 16th day of April, 1906.

RUDOLPH W. GOEB.

Witnesses:
WELLS L. CHURCH,
GEORGE BAKEWELL.